Figure 2:
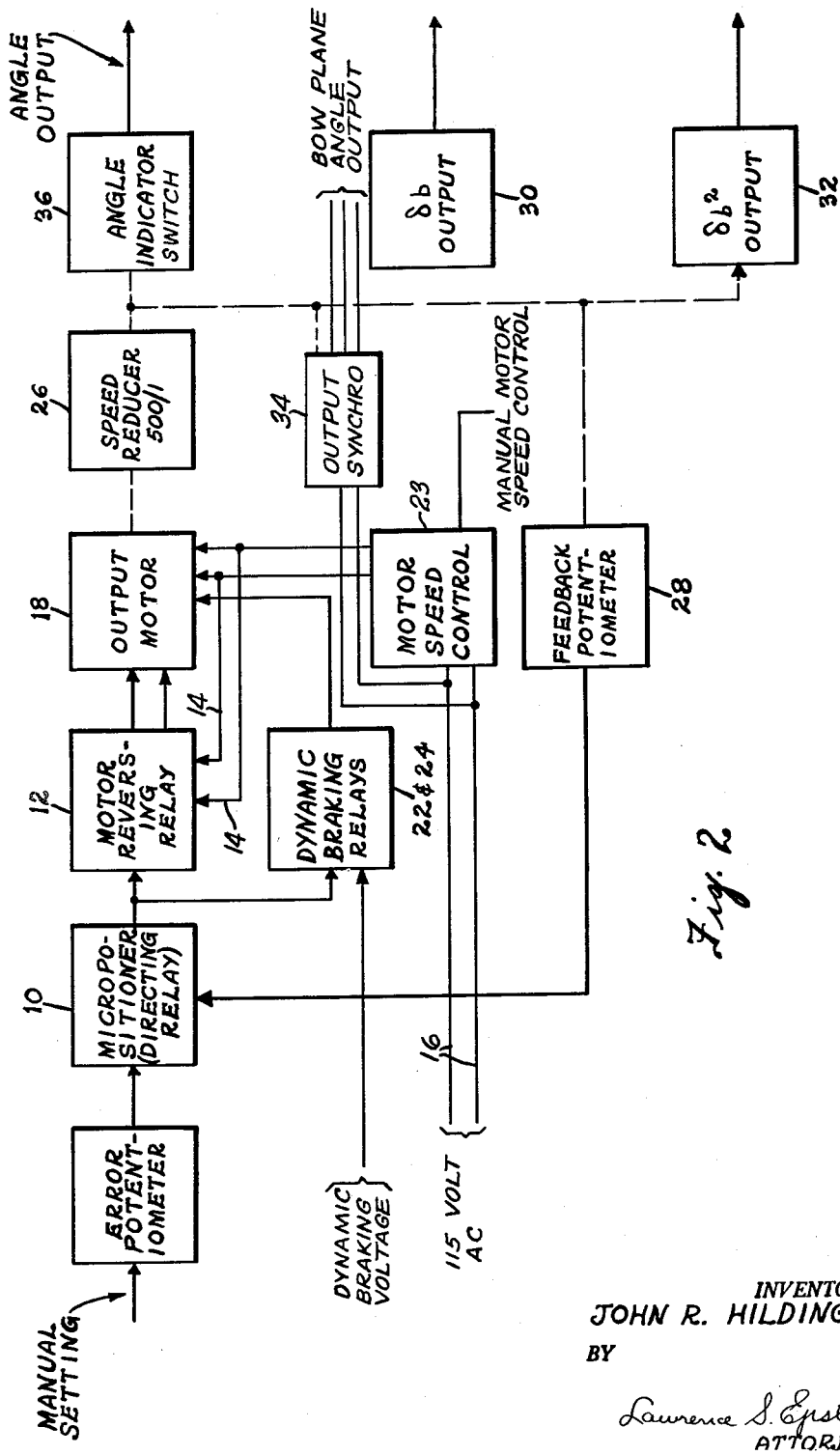

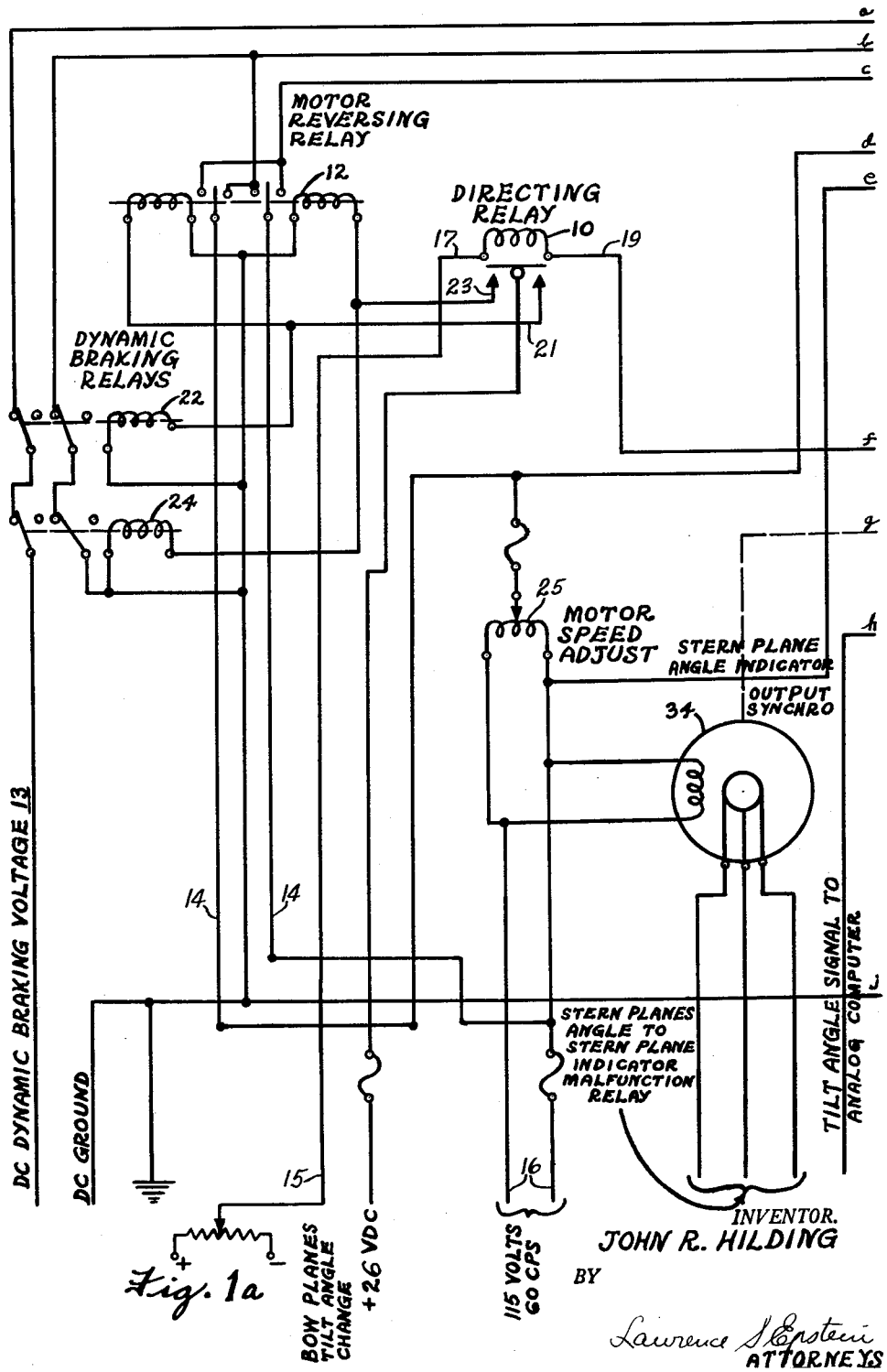

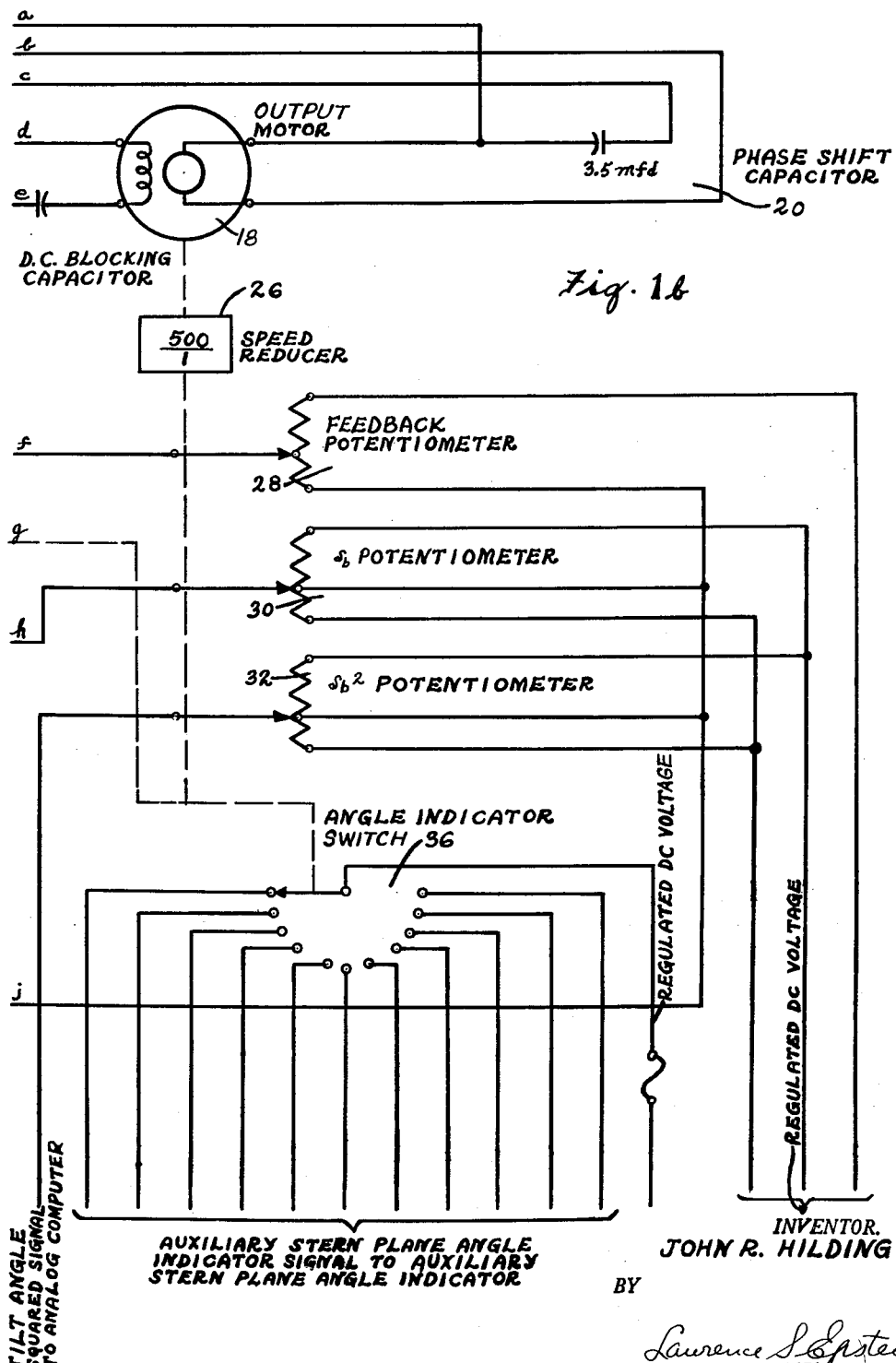

Dec. 11, 1962     J. R. HILDING     3,067,527

RELAY SERVOMECHANISM

Filed March 21, 1960     3 Sheets-Sheet 3

INVENTOR.
JOHN R. HILDING
BY
Lawrence S. Epstein
ATTORNEY

United States Patent Office 3,067,527
Patented Dec. 11, 1962

3,067,527
RELAY SERVOMECHANISM
John R. Hilding, Groton, Conn., assignor, by mesne assignments, to the United States of America as represented by the Secretary of the Navy
Filed Mar. 21, 1960, Ser. No. 16,618
1 Claim. (Cl. 35—11)

This invention relates to apparatus for training students in submarine operation and is particularly directed towards a device which is utilized in training apparatus for electrically computing inherent time delays, angular velocities and positions of various control surfaces contained aboard a submarine. Prior to the invention of this device, mechanical computing devices were utilized to perform these functions. The mechanical types of computing equipment had the disadvantages of large size, high cost and large maintenance. In addition, the mechanical type of computing equipment was not too flexible.

The principal object of the instant invention is to provide a novel method of computing inherent time delays, angular velocities, and positions of various control surfaces contained aboard a submarine.

Another object of the invention is to make computations electrically.

A further object of the invention is to provide an electrical computer device which has small size, low cost and is relatively easy to maintain.

Other objects and many of the attendant advantages of this invention will be readily appreciated as the same becomes better understood by reference to the following detailed description when considered in connection with the accompanying drawing wherein: FIG. 1a shows the micropositioner of the motor reversing relay and the dynamic braking relays; FIG. 1b shows the error potentiometer, the output motor, the angle indicator switch and the gear reducer; and FIG. 2 is a block diagram of the relay servomechanism.

With the reception of a bow plane's tilt angle change signal 15 from the manual handwheel kinesthetic effect unit, polarized directing relay 10 is energized. The direction of energization of this relay 10 depends upon the polarity of the change signal 15. Energization of relay 10 supplies 26 volts D.C. through one set of the relays contacts to one coil of motor reversing relay 12, thus connecting 115 volts, 16, from an external power source across one winding of the servo motor 18 through motor speed adjust 25. This 115 volt input is also connected to the other winding of the servo motor 18 through motor speed adjust 25, connections 14, motor reversing relay 12 and phaseshift capacitor 20. This 115 volt input, 16, is also applied directly to the field winding of output synchro 34. At the same time that one coil of motor reversing relay 12 is energized one of the dynamic braking relays 22 or 24 is energized removing the six volt D.C. braking voltage from the motor at the same time that the A.C. operating voltage from the external powerstat is applied to it. The servo motor 18 is coupled through a speed reducer 26 to three potentiometers 28, 30 and 32 to a synchro 34 and a multicontact rotating switch 36. Potentiometer 28 is a feedback potentiometer. The circuit including this feedback potentiometer 28 is arranged so that when the servo motor 18 is energized it will turn this potentiometer in a direction to decrease the voltage across the direction relay 10. When this voltage across the directing relay 10 is reduced to approximately 0.12 volt, the directing relay drops out deenergizing the motor reversing relay 12 and the dynamic braking relay 22 or 24 and applying six volts D.C. to one of the motor windings causing the motor to stop within a very small fraction of a turn. The outputs from this structure are as follows: a tilt-angle signal from potentiometer 30 to the analog computer, a tilt-angle squared signal from potentiometer 32 to the analog computer, an approximate tilt-angle from angle indicator switch 36 to an external indicator and an exact angle signal from the output syncho 34 to an indicator located remotely and also through an external malfunction relay to another remotely located indicator. The output voltage from the wiper of the feedback potentiometer 28 corresponds to a computed tilt angle and represents an input to an external brush recorder in addition to the function as a feedback input.

In operation, with the reception of a signal representing a change in bow planes tilt angle directing relay 10 is energized closing one set of relay contacts. The closed contacts energize one coil of the motor reversing relay 12 and a dynamic braking relay 22 or 24, causing the motor 18 to rotate until the directing relay 10 drops out.

This action takes place because the servo mechanism is set up as a bridge circuit with the directing relay 10 as a sensing element. The directing relay 10 is connected between the wipers of two potentiometers, i.e. an external potentiometer which gives the error change in bow plane position, and feedback potentiometer 28. When the arm of the potentiometer from the external manual kinesthetic effect unit is moved from a null point to a more positive point, a voltage is impressed across the coil of the directing relay 10. The error signal controls the operation of directing relay 10 which controls the operation of motor reversing relay 12. Depending upon the operation of motor reversing relay 12 there will be a signal of a particular polarity applied through lines 14 and through relay 12 to lines $b$ and $c$ and then to output motor 18. The output from motor speed adjust 25 is applied to both line $d$ and to lines 14 to control the amount of voltage from the 115 volt input which is applied to output motor 18. This causes the motor 18 to rotate, moving the arm of the feedback potentiometer 28 to its null point, thereby decreasing the voltage across the directing relay 10 to zero. The relay thereupon drops out, de-energizing the reversing and braking relays 12 and 22, respectively, thereby stopping the motor. The braking relays 22 or 24 do not operate simultaneously. Rather, each one operates individually when the other one does not. Each of these relays is connected in series with the braking voltage. When no bow planes tilt angle change signal is applied, directing relay 10 is not energized. With directing relay 10 unenergized, dynamic braking relays 22 and 24 are unenergized and the D C. dynamic braking voltage 13 is applied through the de-energized contacts of dynamic braking relays 22 and 24 to motor 18. If, however, a bow planes tilt angle change signal is applied to directing relay 10, this relay is energized in a direction with conforms to the polarity of the input signal. Energization of directing relay 10 energizes one of the dynamic braking relays 22 or 24 depending upon the polarity of the input signal and dynamic braking voltage is removed from motor 18. During this operation, the output potentiometers have been positioned to provide an output voltage simultaneously with positioning of the indicator transmitter synchro and the switch controlling the lighting of the external indicators. Thus, the invention comprises a servo mechanism type of bridge circuit which comprises an error potentiometer, a micro-positioner, a motor reversing relay, a servo motor, a gear reducer, dynamic braking relays and a feedback potentiometer. Operation of the system is accomplished by simply rotating the error potentiometer which generates an error signal for activation of the micropositioner and in turn activation of the motor reversing relay. This causes the servo motor to run thereby driving the feedback potentiometer until the feedback voltage generated across the feedback potentiometer equalizes the error signal. A this time the dynamic braking voltage 13 is applied, effecting an instantaneous stop of the servo motor. The rate of the servo motor (rarians per second) simulates the angular velocity of the control surface being computed by this particular invention. Although prior use has been made of servo systems similar to the above, the instant invention provides very accurate angular positions by the use of the simple electrical and mechanical components and the use of dynamic braking to prevent any oscillation or overshoot.

Obviously, many modifications and variations of the present invention are possible in the light of the above teachings. It is therefore to be understood that within the scope of the appended claim the invention may be practiced otherwise than as specifically described.

What is claimed is:

In an electro-mechanical computer, micropositioner means, a first and a second potentiometer means, said first and second potentiometer means being operatively connected to said micropositioner means to form a bridge circuit, said first potentiometer means being manually positioned in accordance with an error input signal, said micropositioner means being operatively connected to a motor reversing relay, said motor reversing relay being operatively connected to servo motor means, said servo motor means being operatively connected to said second potentiometer means whereby said servo means is driven in a direction in accordance with said input error signal to said first potentiometer means until the position of said second potentiometer means corresponds to the position of said first potentiometer means, dynamic braking means operatively connected to said servo motor means for rapid stopping of said motor motion, said dynamic braking means being operatively connected to said first and second potentiometer means whereby movement of said servo motor means is stopped by said dynamic braking means upon correspondence of said first and second potentiometer means, a gear speed changing mechanism and output means, said gear speed changing mechanism being operatively connected between said output means and said servo motor means, whereby said servo motor means drives said gear change mechanism and said output means to provide an accurate indication of the servo motor position said output means comprising a first output potentiometer means representing the angular rotation of said servo motor means, a second output potentiometer means representing the square of the angular position of said servo motor means, and a third output means which comprises a synchro and provides electrical signals representing the angular position of said servo motor means.

References Cited in the file of this patent

UNITED STATES PATENTS

| | | |
|---|---|---|
| 2,297,187 | Johnson | Sept. 29, 1942 |
| 2,539,616 | Gehman | Jan. 30, 1951 |
| 2,569,697 | Semm et al. | Oct. 2, 1951 |
| 2,731,737 | Stern | Jan. 24, 1956 |